Feb. 13, 1973 A. B. LARSEN 3,716,666
OPTICAL SPATIAL FREQUENCY FILTER
Filed June 29, 1971 4 Sheets-Sheet 1

INVENTOR
A. B. LARSEN
BY
*David L. Hurewitz*
ATTORNEY

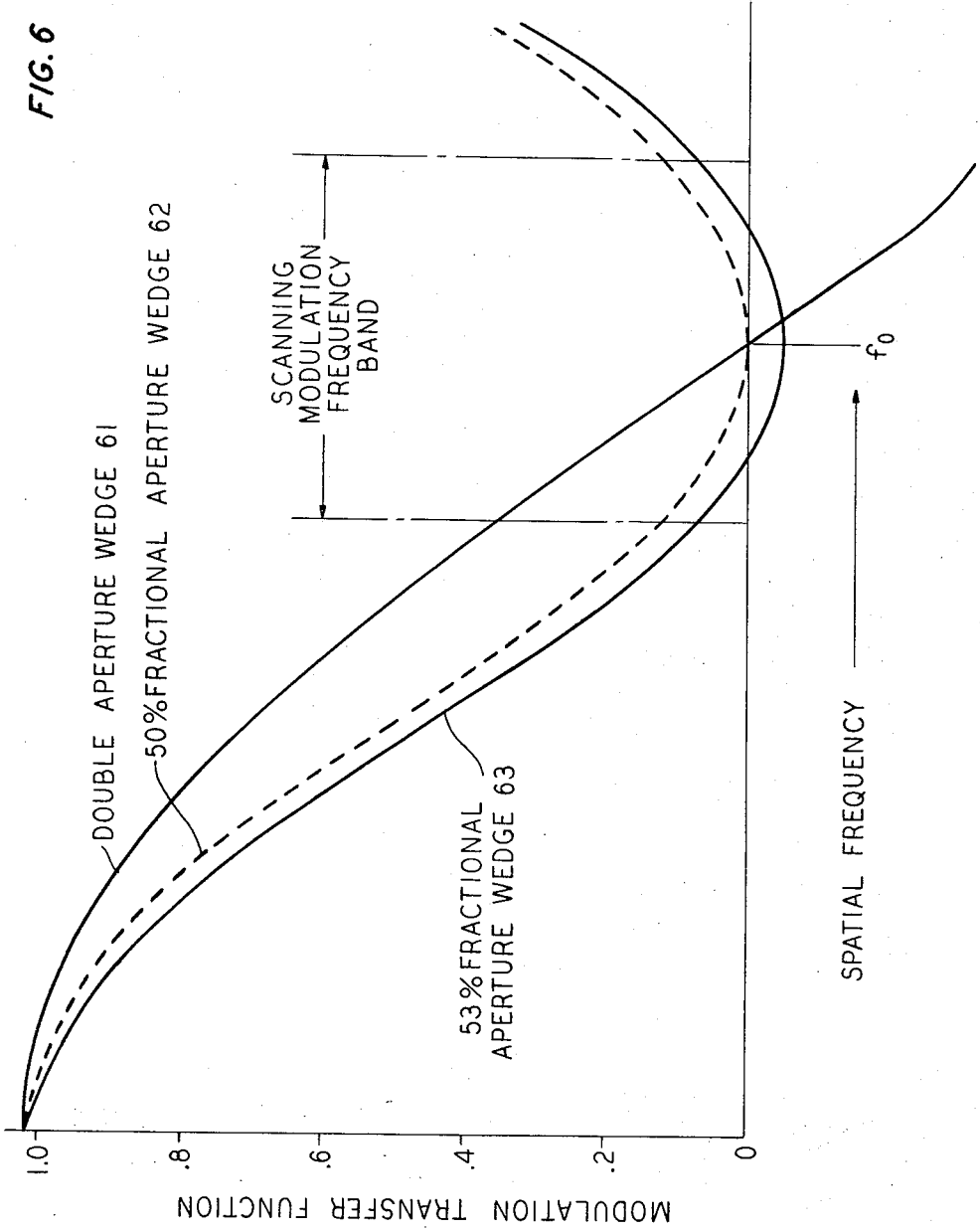

United States Patent Office 3,716,666
Patented Feb. 13, 1973

3,716,666
OPTICAL SPATIAL FREQUENCY FILTER
Arthur Bertel Larsen, Colts Neck, N.J., assignor to Bell Telephone Laboratories, Incorporated, Murray Hill, N.J.
Filed June 29, 1971, Ser. No. 157,995
Int. Cl. H04n 9/06
U.S. Cl. 178—5.4 ST
14 Claims

ABSTRACT OF THE DISCLOSURE

In an optical system for forming a representation of a scene at an image plane, a wedge structure of optical quality material is disposed between the scene and the image plane. The light passing through different sections of the wedge structure is deflected in different directions, forming a plurality of displaced images at the image plane. The summation of the variously displaced images results in a modulation transfer function exhibiting substantial attenuation of the spatial frequency components within a predetermined frequency range. The wedge is designed and oriented to produce angular deflections which yield specific displacements of the images and a corresponding spatial frequency rejection band. The filter may be used to avoid aliasing in color television cameras having striped color modulating gratings by utilizng the wedge to insure high attenuation in the vicinity of the spatial modulation frequency produced by the striped color gratings.

BACKGROUND OF THE INVENTION

This invention relates to optical filtering apparatus, and more particularly to lossless optical spatial frequency filters for attenuating undesired spatial components, especially in color television camera systems employing striped solor filters for optically modulating color images onto a target.

As is well known, transmission of a color representation of a scene ordinarily requires three individual video signals. These signals must be registered in order to produce an acceptable reconstruction of the original scene. To reduce registration problems, cameras utilizing striped color filters for spatially modulating color images have been employed in both one and two tube embodiments. Such cameras are disclosed in U.S. Pat. No. 2,733,291, issued Jan. 31, 1956 to R. D. Kell. In Kell type cameras, each selected color image is spatially modulated by one color filter grating. (As used herein, an image is spatially modulated when it is filtered to form a striped pattern and the frequency of spatial modulation in a given direction is determined by the grating's line repetition rate in that direction.) Conventionally, the target on which two spatially modulated color images are formed is scanned horizontally to generate as part of a complex electrical output two electrically modulated signals, each having a different carrier frequency. A third color image is not spatially modulated and forms part of a baseband signal.

Kell type systems are unfortunately not satisfactory for use in certain television applications, such as the PICTUREPHONE® visual telephone, because the scanning of certain picture content, such as a striped piece of clothing or a region of a person's hair, creates signal components at frequencies corresponding to the carrier frequencies generated by the striped modulating filter. The camera cannot distinguish between actual striped features in the scene and a spatially modulated color. The result is incorrect reproduction referred to as aliasing. One specific form of aliasing is color beading formed by a single sharp vertical edge in the scene. The signal component resulting from the scanning of this edge interferes either constructively or destructively with the component from the color modulating stripes at one point on each horizontal scanning line. The varying phase relationship between these two components from line-to-line manifests itself, if the scene is stationary, as color beads strung along this vertical edge; if the distorting edge moves, the beads appear to move and twinkle.

The problem of aliasing can be greatly reduced by an optical filter which has a spatial frequency rejection band in the vicinity of the spatial frequencies of the modulating striped color filters. Numerous techniques have been proposed. A diffusing aperture is disclosed in U.S. Pat. No. 3,530,233, issued Sept. 22, 1970 to S. Y. Chai, L. H. Enloe and A. B. Larsen. A diffraction technique is shown in U.S. Pat. No. 3,566,013, issued Feb. 23, 1971 to Albert Macovski, and a copending application of A.B. Larsen, T. P. Sosnowski and R. L. Townsend, Jr., Ser. No. 100,- 163, filed Dec. 21, 1970 and assigned to the assignee hereof now U.S. Pat. No. 3,681,519, describes a lossless diffraction grating, referred to as a "phase-only grating." All of these filters suffer from the fact that the resultant filter characteristics are functions of wavelength and hence some desired high spatial frequency information must be lost in order to attain a common spatial rejection band in the region of the color modulating spatial frequencies. Alternative techniques employing defocusing are impractical for three-dimensional scenes since all parts of the scene cannot be simultaneously and optimally defocused.

SUMMARY OF THE INVENTION

In accordance with the present invention, a structure having one or more wedge surfaces is constructed of optical quality material and placed in the aperture plane of the camera's objective lens to differentially deflect the light passing through different regions of the aperture. In this manner, a multiplicity of identical images, each displaced by a fixed amount and direction, is formed at the image plane. The images are 180 spatial degrees out-of-phase for one spatial frequency component of the scene and the addition of these linearly displaced but otherwise identical images effectively generates a lossless optical filter characterstic which nulls that frequency component and severely attenuates those components in its vicinity.

In striped filter color modulating systems, the wedge is designed to pass those spatial frequencies below the spatial color carrier bands and to attenuate the components within the spatial frequency band of the carriers. The wedge filter technique may be embodied in a number of forms, but any form designed in accordance with the invention has a characteristic which is, unlike the other known techniques, effectively independent of the wavelength of the incoming light.

BRIEF DESCRIPTION OF THE DRAWINGS

FIGS. 3A and 3B show two orthogonal views of one alternative version, while FIGS. 4A and 4B show two orthogonal views of the other version;

FIG. 6 is a graphical presentation useful in explaining the present invention.

DETAILED DESCRIPTION

Figure 1:
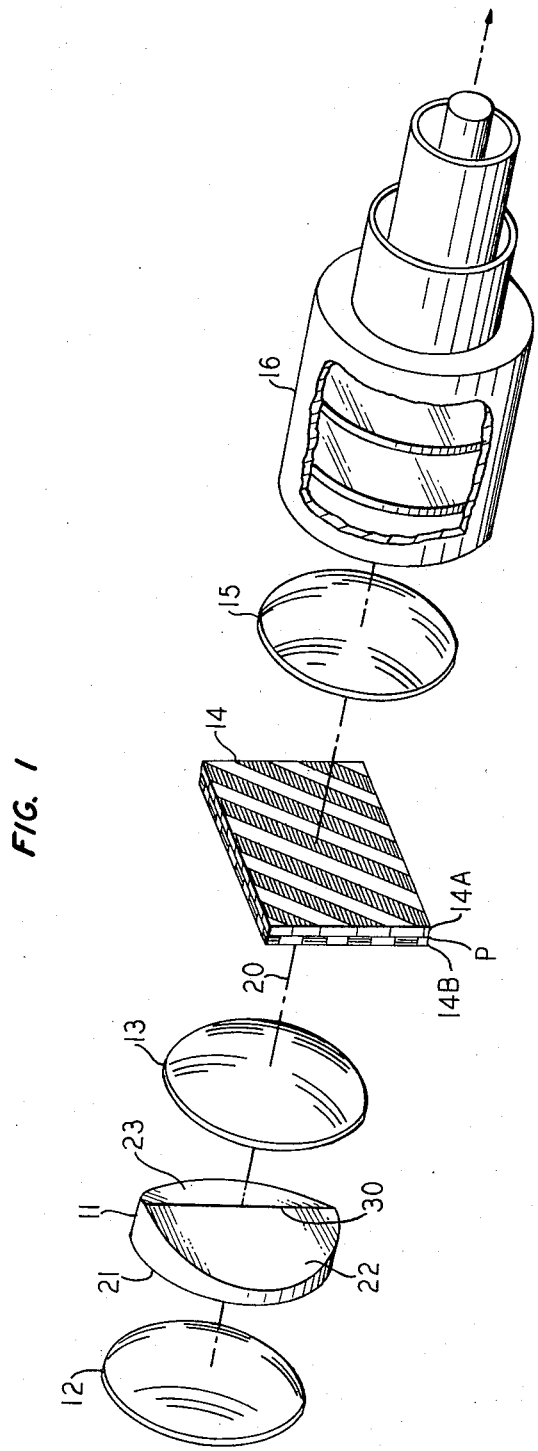
FIG. 1 is a simplified, exploded, perspective view of a single-tube color camera system, including an optical filter in accordance with the present invention.

In FIG. 1 the light from an object scene (at the left) passes through optical wedge element 11, which will be described in greater detail hereinafter, and an object lens system, illustrated by a compound objective consisting of lenses 12 and 13. The system is arranged to form an image at color modulating filter 14, and relay lens 15, in turn, focuses the modulated images onto a suitable single aperture image scanning device 16 which generates electrical signals having characteristics that vary in a given manner in accordance with the variations in the intensities of light on the target along the scanned path. The image scanning device 16 may, for example, comprise an image orthicon pick-up tube having a photosensitive surface onto which the modulated images are focused by relay lens 15. Furthermore, while the color modulator 14 is shown as a separate and distinct element, it may be deposited directly on the photosensitive surface of tube 16, thereby eliminating the need for relay lens 15.

For purposes of explanation, color modulating filter 14 shall be assumed to be of the type disclosed in copending application, Ser. No. 7501, of the present inventor, filed Feb. 2, 1970, and assigned to the assignee hereof. As described in greater detail in that application, striped gratings 14A and 14B, similar to those in the aforementioned Kell patent, are placed in the light path between the scene and the camera tube's target, and are responsible for the generation of selected high frequency energy distributions as the beam scans the filtered images. Grating patterns 14A and 14B each comprise parallel uniformly spaced sections of material providing relatively low transmission of a specific region of the color spectrum; the spaces between these sections provide high transmission in this region and essentially transmit all light. Conventionally, successive sections and spaces of each grating constitute pairs of stripes which alternately transmit substantially all light and substantially block a single primary color. One grating 14A may provide a repetitive alternating pattern of totally red-transmitting stripes and opaque-to-red light stripes. The other grating 14B provides a repetitive alternating pattern of blue-transmitting and opaque-to-blue light stripes. In this manner gratings 14A and 14B, which are conventional striped color filters of the dichroic or absorption type, provide at the camera tube target spatial modulation of two different color components of the input scene. This produces in the scanning output a carrier and upper and lower sideband for each color image, with the carrier frequency proportional to the spatial frequency of the gratings in the scanning direction. Light not blocked by the stripes of gratings 14A and 14B passes unaffected to the target and this light, conventionally containing the green primary image, combined with portions of the other color images that have been transmitted by the gratings, results in the baseband portion of the output spectrum.

While a particular form of color modulation filter 14 has been described, it is understood that the principles of the present invention are in no way limited thereto and are equally applicable to optical systems in general, but are particularly useful in camera tube arrangements that utilize color dependent modulation. An optical filter, in accordance with the present invention, can be advantageously employed in the single tube color camera system disclosed in the application of S. Y. Chai, Ser. No. 7500, filed Feb. 2, 1970, and assigned to the assignee hereof, or even in the basic single-tube color camera system of the aforementioned Kell patent.

Figure 2A:
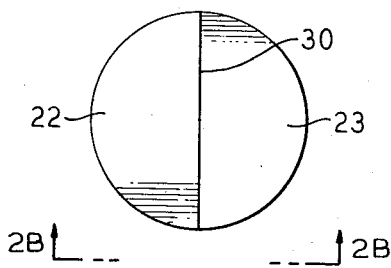
FIGS. 2A and 2B are enlarged views of the optical element of FIG. 1 in two orthogonal views.
Figure 2B:
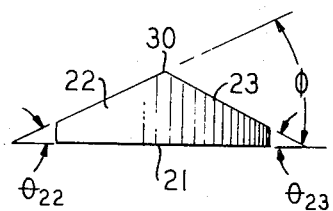
Figure 3A:
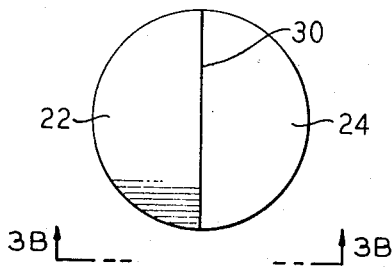
FIGS. 3A, 3B, 4A and 4B illustrate alternative versions of the optical element.
Figure 3B:
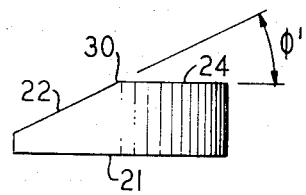

A fundamental problem introduced by the use of gratings for color separation is that of crosstalk from spatial components of the input image that have frequencies at or near those of the color separation gratings. Areas of the scene having high spatial frequencies, such as striped suits, are reproduced with a strong overlay of a color if the frequency components of the image of the high frequency area are in the vicinity of the spatial frequency band corresponding to that color. Step changes in the image brightness, as result from single vertical or near-vertical edges in the subject, likewise generate frequency components within the bands allotted to the color signals. These spatial frequencies will interfere either constructively or destructively with the grating stripes, giving either an increase or decrease in the appropriate color. In the typical situation, the edge in the image is not parallel to the grating stripes. Interference therefore varies along the edge, causing it to appear strung with color beads, and if in motion, such edges twinkle annoyingly. These image impairments can be avoided by preventing any such high spatial frequency subject information from reaching the gratings In accordance with the present invention, an optical spatial filter arrangement suppresses the spatial components of the object scene which are close to the spatial frequencies of modulating gratings 14A and 14B as measured in a common (typically horizontal) direction. In its simplest form, as shown in FIG. 1 and FIGS. 2A and 2B, the filter, which is placed in the aperture plane of an imaging system, consists of a double wedge which occupies the full aperture. Passage through the wedge structure causes one portion of the light from any given point in the scene to be refracted at one angle and another portion to be refracted at another angle. These angles are, except for the negligible dispersion of the optical materials forming the wedge, independent of wavelength. If a striped pattern is imaged through this system, the resultant relative displacements of the striped images in the image plane P, which may be at the photosensitive surface of the camera tube, can be a significant fraction of the period of the pattern. In fact, for one specific spatial frequency of the pattern, the displacement is such as to superimpose one refracted striped image at a spatial phase shift of 180 degrees with respect to the other refracted image. The addition of these two equal amplitude but spatially out-of-phase images thereby cancels the image components at the specific spatial frequency. If the filter system is designed so that this nulled or cancelled frequency is at or near the spatial frequency of a color modulating filter as measured in the scanning direction, components capable of causing aliasing or color beading can be eliminated, and areas of the scene containing these undesired spatial components are modulated as if they were regions of uniform color. In Fourier series terms, the system operates to pass the DC components of the image while rejecting the high frequency components. In order to avoid aliasing, the scene's spatial frequencies in the vicinity of the spatial frequency of the color modulating filter as measured in the scanning direction (hereinafter referred to as the scanning modulation frequency band which includes all modulated color channels) must be rejected, but it is noted that in addition to fulfilling this requirement the complete filter characteristic of the wedge structure produces a combing action in the spatial frequency domain.

As seen in FIGS. 1, 2A and 2B, double wedge, full aperture element 11 consists of back plane surface 21, which is positioned as shown in FIG. 1 essentially parallel to plane P and perpendicular to optical axis 20, and wedge surfaces 22 and 23 which are plane surfaces inclined to surface 21. Surfaces 22 and 23 are inclined to each other and meet at an angle $\varphi$ at their common edge 30 which is perpendicular to optical axis 20. Wedge element 11, which is made of optical quality material of a single index of refraction, is preferably positioned so that edge 30 is in a vertical orientation relative to the horizontal or scanning direction of tube 16.

Alternative embodiments of a wedge element, in accordance with the present invention, are shown in FIGS. 3A, 3B, 4A and 4B. As in the embodiment of FIG. 2, wedge elements of FIGS. 3 and 4 have a plane back surface 21 and at least one wedge surface inclined to surface 21. In FIG. 3 plane surface 24 lies parallel to back surface 21 and joins wedge surface 22 at an angle $\varphi'$ at edge 30; the single wedge surface 22 occupies only a portion of the aperture. In FIG. 4, two wedge surfaces 22' and 23' exist, but these surfaces fill only a fractional portion of the aperture, the remainder being occupied by surface 25 which is parallel to back surface 21. Wedge surfaces 22' and 23' meet at an angle $\varphi''$ at edge 30'.

Figure 5:
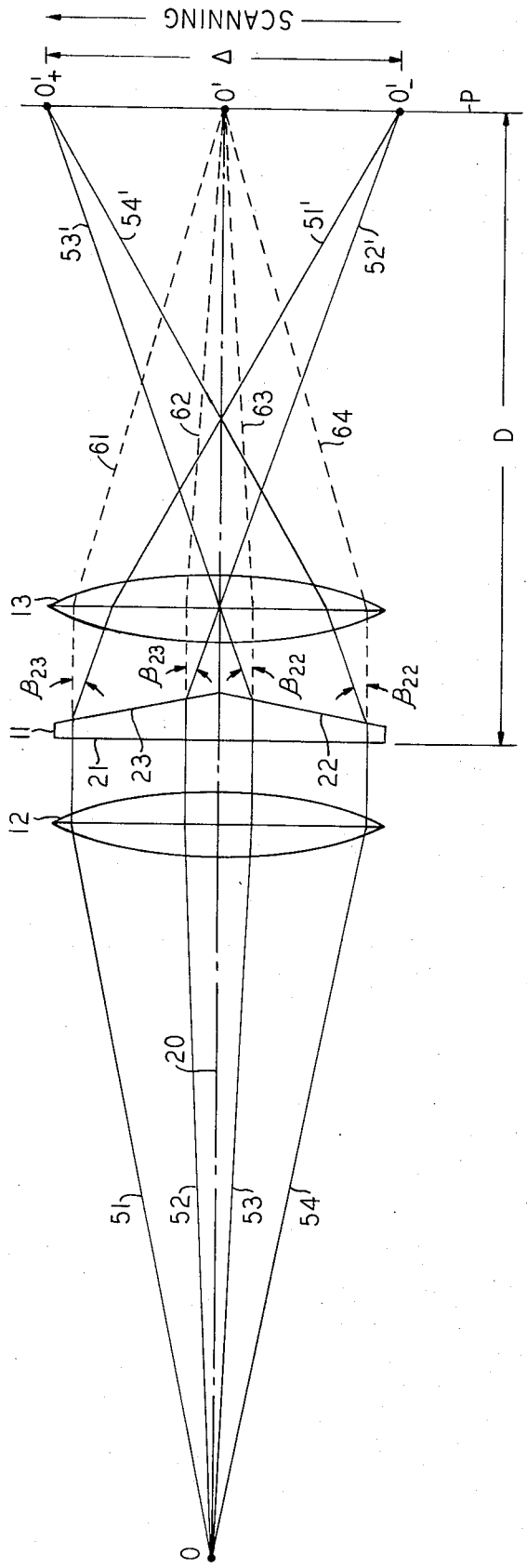
FIG. 5 is a diagram illustrating the operation of the optical filter in accordance with the present invention.

FIG. 5 shows a diagrammatic top view of a compound objective with double wedge element 11 similar to the arrangement in FIGS. 1, 2A and 2B. In the absence of wedge element 11, selected rays 51, 52, 53 and 54, from an object O would be imaged as shown by dotted rays 61, 62, 63, and 64, respectively, at O' in image plane P. Rays, such as 51 and 54 at the extremities of the lens arrangement, would be bent more than those, such as 52 and 53, nearer the optical axis 20. Color modulating filter 14 is located at plane P, which may be coextensive with the photosensitive surface of tube 16, or may be removed therefrom and separated by a relay lens, such as illustrated in FIG. 1.

The inclusion of wedge element 11 causes additional deflection of the rays by refraction at the surfaces of element 11. Those rays entering the lens structure on either side of an imaginary plane defined by optical axis 20 and common edge 30 (i.e., a plane perpendicular to the paper along line 20 in FIG. 5) are deflected at the wedge toward this imaginary plane. Those rays, such as 51–51' and 52–52', which, at wedge element 11, are on one side of this imaginary plane (shown above line 20) are so bent that they focus at a point $$O'_-$$

in plane P displaced in the horizontal direction from point O'. Similarly, point O is imaged via rays 53–53' and 54–54' at point $$O'_+$$

oppositely displaced in the horizontal direction from point O'.

In order to eliminate those spatial frequencies known to cause difficulties, the separation $\Delta$ between points $$O'_+ \text{ and } O'_-$$

shown greatly enlarged for purposes of illustration, must be approximately equal to one-half the horizontal period of the color modulating grating. With this double wedge, full aperture structure, each point O in the originating scene contributes equal amounts of light to both the high and low transmissive regions of the modulating grating so that light variations in the modulating frequency band on the photosensitive surface are due exclusively to the periodic variations in the grating transmissivity and not the scene content. Thus, by appropriately separating the multiplicity of image points, undesired spatial frequencies are essentially eliminated from the scene image at plane P. In the case of the single wedge shown in FIGS. 3A and 3B, the plane surface 24 would transmit one image to a nondisplaced point, such as O' while the single wedge surface 22 would displace the second image. To cancel similar spatial frequencies, as are cancelled by the double wedge element of FIGS. 2A and 2B, the deflection at inclined surface 22 of the single wedge element would have to equal the sum of the individual deflections produced at the two inclined surfaces 22 and 23 of the double wedge element.

Figure 4A:
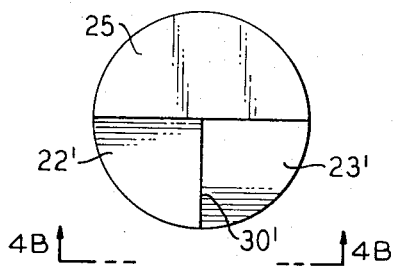

The wedge element in FIG. 4A operates similarly to the wedge element of FIGS. 2A and 2B, producing two displaced image points $$O'_+ \text{ and } O'_-$$

and in addition, passing undeflected light to position O'. As the inclined and parallel surfaces may be present in varying relative amounts, depending upon the fractional portion of the aperture devoted to wedge surfaces, this is referred to as a fractional aperture wedge element. The areas devoted to inclined surfaces 22' and 23' are essentially identical, but parallel surface 25 may occupy a greater or lesser fraction than the one-half illustrated, depending on the filter characteristic desired.

Notwithstanding which version of wedge element is utilized, the prescribed separation is determined by the angle of inclination between the surfaces intersecting at the line 30, the optical properties of the material of the element and the adjacent media, and the distance D between the wedge and the image plane P. With reference to the double wedge shown in FIG. 1 and FIGS. 2A and 2B, where the common edge 30 is vertical relative to the horizontal or scanning direction, the rays passing through each inclined wedge surface 22 and 23 are deflected by an angle $\beta$:

$$\beta = (N-1)\theta \tag{1}$$

where N is the index of the refraction of the wedge material and $\theta$ is the wedge angle between back surface 21 and the intersecting inclined wedge surface. The index of refraction of the surrounding medium is assumed to be unity. As seen in FIG. 2B, $$\phi = \theta_{22} + \theta_{23} \tag{2}$$

The angular deflection results in a differential horizontal image displacement $\Delta$ (as measured in the image plane P) of an amount $$\Delta = D\phi(N-1) \tag{3}$$

where D is the wedge to image plane distance. This relationship, which is independent of wavelength, is an approximation which is accurate for thin lens systems; the use of a thick lens would necessitate additional terms to account for transit within the lens. In the case of the double wedge, the two wedge surfaces displace the image by equal amounts in opposite directions from their common position O'. An image component which in the absence of the wedge would have been imaged in the x or scanning direction as $$I_0 = A \sin \omega x \tag{4}$$

with wedge element 11 in place, appears as $$I_1 = I_{O'-} + I_{O'+}$$
$$= A/2 \sin \omega \left(x - \frac{\Delta}{2}\right) + A/2 \sin \omega \left(x + \frac{\Delta}{2}\right) \tag{5}$$
$$= A \sin \omega x \cos \omega \frac{\Delta}{2}.$$

The modulation transfer function (MTF) for the wedge element is thus given by:

$$MTF = I_1/I_0 = \cos \frac{\omega \Delta}{2}. \tag{6}$$

The MTF is zero for those values of $\omega$ when $$\frac{\omega \Delta}{2} = \frac{(2n+1)\pi}{2}, n = 0, 1, 2 \ldots \tag{7}$$

The first zero of the MTF thus occurs when $\Delta = \pi/\omega$ and hence by proper choice of $\Delta$ a zero of the transfer function can be placed at any desired radian spatial frequency, $\omega$, such as the center of the scanning modulation frequency band. Knowing the desired $\Delta$ and the other parameters of the optical system, the required wedge angle $\varphi$ is obtained from Equation 3.

Figure 4B:
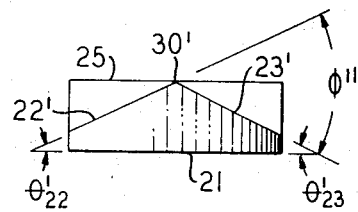

The MTF generated by such a wedge is plotted as curve 61 of FIG. 6. While having the desired zero at the center frequency $f_0$ of the selected or scanning modulation frequency band, the transfer function is nonzero elsewhere within the channel. Thus, objects that generate image spatial frequencies within the modulating band of the color channel, but away from the zero of the wedge element MTF could still introduce spurious signals into the color channel. It would be clearly advantageous to have an optical filter that would block a whole band of spatial frequencies, while passing frequencies in a lower band with as little attenuation as possible. This is achieved in part by the fractional aperture wedge, such as is shown in FIGS. 4A and 4B, where the wedge surfaces occupy only a portion of the aperture, the remainder containing only a parallel surface which passes the light without deflecting it. In a preferred embodiment, the areas of surfaces 22' and 23' are equal, as are the angles $$\theta'_{22} \text{ and } \theta'_{23}$$

and each surface passes an equal amount of the incident light.

The transfer function of this fractional aperture wedge is obtained by multiplying the MTF of the full aperture double wedge (Equation 6) by the fraction of the aperture occupied by wedge surfaces and adding the product of the remaining fraction of the aperture occupied by the parallel surface and the MTF of this plane parallel surface. Since the spatial frequencies at which the wedge erhibits significant effects are assumed to be much lower than those for which the diffraction of the aperture becomes important, the MTF of the plane parallel surface is essentially unity.

How the apertures are divided between wedge and ɪ lane parallel regions determines the nature of the resulting MTF. For the easily fabricated case of a 50 percent fractional aperture wedge, illustrated in FIGS. 4A and 4B, half the incident light is passed undeflected by surface 25. The above procedure shows the resultant MTF to be simply $$.5 + .5 \cos \frac{\omega \Delta}{2},$$

which has a zero when $$\frac{\Delta}{2} = \frac{\pi}{\omega}$$

This case is plotted as curve 62 in FIG. 6. Note that this MTF has its first zero at $\Delta = 2\pi/\omega$, that is, the deflected images are separated by one period, and the wedge angle $\varphi''$ of FIG. 4B must be twice the angle $\varphi$ of the full aperture wedge of FIG. 2B for the resulting optical systems to have their first zeros at the same spatial frequency. The effect of increasing the wedge fraction of the aperture from .5 to .53 is shown in curve 63 where the MTF is then $$.47 + .53 \cos \omega \frac{\Delta}{2}$$

This no longer provides a zero in the center of the passband, but does give a lower average transmission over the scanning modulation frequency band. The MTFs produced by other combinations of wedge and parallel plane surfaces can be similarly determined.

All the arrangements shown in FIGS. 2–4 allow the aperture to be varied by a convtntional circular iris diaphragm without altering the portion of the incident light that passes through each of the regions, thus making the MTF independent of the lens aperture.

Though the wedge element is shown with a single entry surface 21 facing the object, the system operates equally well with the element in a reversed position so that line 30 faces the object and the deflected rays exit at surface 21.

In television systems the purpose of the optical filtering technique is to prevent high frequency luminance signals from appearing in the color channels of single or two-tube cameras using spatial modulation, but it is also noted that the optical technique described is not limited to color television applications, since it may be used to effectively eliminate selected spatial frequency components from an image of any object scene for any purpose. In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. An optical spatial filter for attenuating a selected spatial frequency component of an image comprising, an image plane, lens means for focusing in the image plane light from an object, and wedge means having a first plane surface and a plurality of other plane surfaces at least one of the other plane surfaces being inclined to the first surface for deflecting a first portion of the light from the object to form a first image in the image plane and to form a second image in the image plane from a second portion of the light from the object, said wedge means being arranged to displace the first and second images from each other by one-half the period of the selected spatial frequency component.

2. An optical spatial filter for attenuating a selected band of spatial frequency components of an image comprising, an image plane, light guiding means for establishing a light path from an object to the image plane, and a wedge element positioned in the light path and having a plane entry surface and at least one exit surface inclined to the entry surface, the angle of inclination being such that the modulation transfer function of the light guiding means and the wedge element is zero at frequency within the selected band.

3. An optical spatial filter for forming at an image plane a plurality of displaced images of an object comprising:
   means for guiding light along a path from the object to the image plane, and
   a wedge element having a first plane surface, at least one wedge surface inclined to the first surface and another surface inclined to the one wedge surface, said wedge element being positioned in the light path so that light from the object is incident on said wedge element and one portion of the incident light is deflected by the one wedge surface and another portion of the incident light is deflected by the other surface, the surfaces being inclined and oriented so that the portions of light are deflected in different preselected amounts to form identical and displaced images at the image plane, whereby preselected spatial components of the composite image at the image plane are attenuated.

4. An optical spatial filter as claimed in claim 3 wherein the surfaces of the wedge element are inclined and oriented so that the displaced images are separated in a selected direction by approximately one-half the period of the preselected spatial components to be attenuated, whereby the modulation transfer function of the filter is approximately zero within a frequency range containing the preselected spatial components.

5. An optical spatial filter as claimed in claim 3 wherein said means for guiding light includes a compound objective lens, and wherein said wedge element is positioned in the aperture plane of the lens.

6. An optical spatial filter as claimed in claim 3 wherein the wedge element is constructed of material having a single index refraction and said other surface inclined to the one wedge surface is parallel to the first plane surface and intersects the one wedge surface at a common line which is positioned parallel to the image plane.

7. An optical spatial filter as claimed in claim 3 wherein the wedge element is constructed of material having a single index of refraction and said other surface inclined to the one wedge surface is also inclined to the first surface and intersects the one wedge surface at a common line which is positioned parallel to the image plane.

8. An optical spatial filter as claimed in claim 7 wherein said one and said other surfaces are equally inclined to the first surface, and said wedge element further includes an additional surface positioned parallel to the first surface so that a portion of the incident light passes through the additional surface forming a third image on the image plane, the images formed by the light deflected by both said one and said other surfaces being displaced in a selected direction from the third image by approximately one-half the period of the preselected spatial components to be attenuated.

9. A color television camera system for reproducing an object scene comprising, an image scanning device, striped color filter means disposed in the light path from the object scene to said image scanning device and serving to spatially modulate at least one of the color images from the object, and optical filter means including a lens and wedge structure, said wedge structure being designed and oriented to produce selected angular deflections of portions of the light from the object, said deflections being selected to produce a modulation transfer function of the optical filter means exhibiting substantial attenuation of those spatial frequency components in the vicinity of the spatial frequency of the striped color filter means in the direction of the scan.

10. A color television camera system as claimed in claim 9 wherein said preselected angular deflections are chosen to produce on the target of the scanning device at least two images displaced by approximately one-half the period of the stripes of the color filter means in the scanning direction.

11. A color television system as claimed in claim 9 wherein said lens is a compound objective lens and said wedge structure is positioned in the aperture plane of the lens.

12. A color television camera as claimed in claim 9 wherein said wedge structure includes a first plane surface, a wedge surface inclined to said first surface and another surface inclined to the wedge surface and parallel to the first surface, said wedge and other surfaces being arranged so that the deflected portions of light form on the striped color filter means two individual images displaced from each other.

13. A color television system as claimed in claim 9 wherein said wedge structure includes a first plane surface and two wedge surfaces, each wedge surface being inclined to said first plane surface and to each other, and said two wedge surfaces being arranged so that the deflected portions of light form on the striped color filter means two individual images displaced from each other.

14. A color television camera system as claimed in claim 13 wherein said wedge structure further includes an additional surface positioned parallel to the first surface and adjacent said two inclined wedge surfaces, said additional surface forming a third image on the striped color filter means, the individual images formed by the wedge surfaces being displaced from the third image by approximately one-half the period of the stripes of the color filter means in the scanning direction.

References Cited

NHK Lab Notes, "Recent Developments of Color TV Cameras at NHK," Hayashi et al. September 1967, pp. 1–14.

RICHARD MURRAY, Primary Examiner